United States Patent Office 3,377,245
Patented Apr. 9, 1968

3,377,245
METHODS AND COMPOSITIONS FOR
TREATING HYPERTENSION
Roy Fielden, Albert Lawrence Green, and Derek William
Hills, Welwyn Garden City, England, assignors to Smith
Kline & French Laboratories, Philadelphia, Pa., a corporation of Pennsylvania
No Drawing. Filed Mar. 29, 1966, Ser. No. 538,227
Claims priority, application Great Britain, Apr. 8, 1965, 15,046/65, 15,047/65
9 Claims. (Cl. 167—65)

ABSTRACT OF THE DISCLOSURE

This invention is concerned with compositions and methods for treating hypertension in animals with β-hydroxy-β-phenyl-ethyl-guanidine.

---

This invention relates to new pharmaceutical compositions having hypotensive activity.

It has surprisingly been found that certain guanidine derivatives have the ability to deplete stores of catechol amines such as the sympathomimetic amines adrenaline and noradrenaline selectively from peripheral sympathetically-innervated tissues in the animal body without causing adrenergic nerve blockade and that as a result of this ability these guanidine derivatives, when administered orally, are able to exert, after an initial short-lived hypertensive effect, a hypotensive effect of comparatively much longer duration without the accompanying disadvantageous effects of adrenergic neurone blockade.

One such guanidine derivative is β-hydroxy-β-phenylethylguanidine, which has the structural formula:

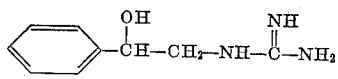

Accordingly there is provided in accordance with one aspect of the invention a pharmaceutical composition adapted for internal, preferably oral, administration comprising as the active ingredient a pharmaceutically acceptable acid addition salt of β-hydroxy-β-phenylethylguanidine, in association with a pharmaceutical carrier therefor.

The invention also includes the method of depleting stores of catechol amines selectively from peripheral sympathetically-innervated tissues of animals without causing adrenergic nerve blockade, which comprises administering an effective therapeutic dose of a pharamaceutically acceptable acid addition salt of β-hydroxy-β-phenyl-ethylguanidine internally to the animals, especially to a hypertensive animal.

The pharmaceutical composition will comprise any of the forms customarily employed for oral or parenteral administration. Thus the composition may be in liquid form, for example a solution or suspension specifically adapted for oral administration, or in solid form, for example a tablet or capsule. Advantageously the composition can be made up in a dosage unit form adapted for oral administration, for example a tablet, capsule, pill, cachet, sachet or packaged powder. If necessary the dosage unit can be made up in a sustained release form so as to give a controlled dosage over an extended period of time.

The carrier for the active ingredient may be an orally ingestible container such as a gelatin capsule and/or a diluent substance in association or admixture with the active ingredient. Examples of such diluents are lactose, sucrose, terra alba, maize starch, peanut oil, olive oil and sesame oil. There may also be present in the composition a pharmaceutical excipient such as an adhesive, for example gelatin (liquid), a lubricant, for example stearic acid or talcum, a sweetening agent, for example saccharin or sorbitol, a buffering agent, for example citric acid or sodium citrate, or a preservative, for example sodium benzoate.

The total daily dose of the active ingredient may vary from about 2–500 mg. (calculated as the base), preferably from about 10–100 mg., and accordingly the amount of the active ingredient present in the composition should be sufficient to provide the required hypotensive effect when administered either in a single daily dosage or in a plurality of dosage administrations per day. Thus when the composition is in dosage unit form, each dosage unit may contain, for example, from 5 to 50 mg. of the active ingredient calculated as the base.

The nontoxic acid addition salts of the compound of Formula 1 may be prepared by reacting β-hydroxy-β-phenylethylamine with an isothiouronium salt, preferably S-methyl-isothiouronium sulfate, to obtain the corresponding guanidine salt. If desired or necessary, the salt obtained in this manner may be converted into other pharmaceutically acceptable acid addition salts by double decomposition with appropriate salts, for example barium chloride, to prepare the usual inorganic salt forms useful to the art such as the sulfate, phosphate, hydrochloride, sulfamate, etc.

It has also been unexpectedly discovered that the l-isomer as distinguished from the racemic mixture or the d-isomer possesses further unexpected biological properties. These advantages are apparent from the following biological data:

| | Laevorotatory | Dextrorotatory | Racemic |
|---|---|---|---|
| Activity (dose, S.C., in mg./kg. in mice required to produce 50% depletion of catechol amines four hours after dosing). The drug is equally active by the oral route | 0.25 | >1.0 | 0.5 |
| Toxicity (acute toxicity in male mice, LD₅₀ mg./kg.): | | | |
| I.V. | 69.5 | 50.4 | 56.5 |
| S.C. | 230 | 330 | 303 |
| Production of adrenergic nerve-blockade | No | No | No |
| Antagonism of adrenergic nerve-blockade produced by other drugs | No | Yes | Yes |

The laevo isomer is a new compound never reported in the prior art to our knowledge while the racemic mixture is an old compound for which the amine depleting activity described herein has been recently discovered. The biological properties of the laevo isomer reported above are believed totally unexpected over the activity possessed by the racemic form of the compound. Since the pure active laevo isomer can be used more precisely but in the same general manner as the racemic mixture the most useful daily dosage range may vary from about 2–200 mg. (based on the free base) with the most usual and preferred dosage unit being from about 5–50 mg. of the base.

The *l*-isomer of β-hydroxyphenylethylguanidine and the pharmaceutically acceptable acid addition salts thereof are, as stated above, novel compounds and therefore in accordance with a further aspect of the invention there is provided a process for preparing salts of *l*-β-hydroxyphenylethylguanidine, which comprises; (a) reacting *l*-β-hydroxyphenylethylamine with an isothiouronium salt, preferably S-methyl-isothiouronium sulfate, to obtain the corresponding *l*-guanidine salt, which can be converted into another salt using known standard procedures or alternatively (b) resolving a racemic mixture of a salt of β-hydroxyphenylethylguanidine with an optically active acid. The *l*-amine starting material employed in (a) above, may be obtained either by resolving a racemic mixture of β-hydroxyphenylethylamine with an optically active acid, or by the reduction of *l*-mandelamide with a reducing agent, for example lithium aluminum hydride.

EXAMPLE 1

A mixture of *dl*-β-hydroxy-β-phenylethylamine (14 g.), S-methylisothiouronium sulfate (14 g.) and water (28 ml.) is heated on a water bath in a flask fitted with a reflux condenser leading to a methyl mercaptan trap. Methyl mercaptan liberation begins at about 60° C. and the temperature is raised slowly to 100° C. (over about one hour) so as to maintain a steady gentle rate of reaction. The temperature is kept at 100° C. for a further hour and then allowed to drop, to crystallize *dl*-β-hydroxy-β-phenylethylguanidine sulfate. The salt crystals are filtered off, sucked as dry as possible and then, while still slightly damp, recrystallized from ethanol/water (4:1). A second recrystallization from the same solvent mixture gives 12 g. of the product, M.P. 223–224° C.

EXAMPLE 2

Tablets are prepared by mixing and granulating in accordance with known pharmaceutical techniques the following ingredients:

| Ingredient: | Mg./tablet |
| --- | --- |
| *dl*-β-hydroxy-β-phenylethylguanidine sulfate (≡50 mg. of base) | 63.5 |
| Maize starch | 29.0 |
| Terra alba | 287.0 |
| Powdered sucrose | 11.0 |
| Gelatin (as a 5% w./v. aqueous solution) | 2.5 |
| Talcum | 3.5 |
| Stearic acid | 3.5 |

The tablets are administered orally to a hypertensive host.

EXAMPLE 3

A suspension for oral administration is prepared in accordance with known pharmaceutical techniques from the following ingredients:

| Ingredient: | Percent w./v. |
| --- | --- |
| *dl*-β-hydroxy-β-phenylethylguanidine sulfate | 0.127 |
| Sodium saccharin | 0.050 |
| Sodium benzoate | 0.050 |
| Citric acid | 0.200 |
| Sodium citrate | 0.050 |
| Colouring, q.s. | |
| Flavouring, q.s. | |
| Sorbitol syrup | 35.0 |
| Purified water, q.s. to | 100.0 |

EXAMPLE 4

*dl*-β-Hydroxyphenylethylamine (100 g.) is added to 110 g. of D-tartaric acid dissolved in 240 ml. of boiling water. Charcoal is added and the resulting mixture is again boiled and then filtered. The filtrate, after standing for several days at 0° C., deposits a mass of large colourless prisms which are filtered off, washed with a minimum quantity of ice-cold water and then dried in vacuo. The resulting sticky product is purified by boiling with ethanol (250 ml.) and, after cooling, the crystalline product so obtained is filtered off and washed with a little ethanol and then with ether. The remaining damp crystals are dissolved in 110 ml. of water and the resulting solution basified with 2 N NaOH. The free base so formed is extracted with chloroform, and the chloroform extract is dried with anhydrous $MgSO_4$. Any remaining solvent is then evaporated leaving an oil which later solidifies to a low-melting pale yellow solid which is substantially pure *l*-β-hydroxyphenylethylamine.

The *l*-β-hydroxyphenylethylamine (14 g.), S-methylisothiouronium sulfate (14 g.) and water (28 ml.) are heated on a water bath in a flask fitted with a reflux condenser leading to a methyl mercaptan trap. Methyl mercaptan liberation begins at about 60° C. and the temperature is raised slowly to 100° C. (over about one hour) so as to maintain a steady gentle rate of reaction. The temperature is kept at 100° C. for a further hour and then allow to drop when the desired product crystallizes out. The crystals are filtered off, sucked as dry as possible and then, while still slightly damp, recrystallized from ethanol/water (4:1). A second recrystallization from the same solvent mixture gives 12 g. of *l*-β-hydroxyphenylethylguanidine sulfate, having an $[\alpha]_D^{23}$ of −31 to −33° in 50% aqueous ethanol, which corresponds to an optical purity of about 95%.

EXAMPLE 5

*dl*-β-Hydroxyphenylethylamine (500 g., 3.65 moles) is added with stirring to (*d*)-tartaric acid (550 g., 3.65 moles) dissolved in boiling water (1 l.). The yellow solution is boiled with charcoal, filtered and allowed to cool to room temperature. It is then preferably seeded and stored at 0 to 4° for several days. The viscous supernatant liquid is decanted off and the chunky crystalline mass is rinsed with ice-water, filtered and dried. Yield 150 to 250 g., $[\alpha]_D^{23}$ −10 to −13° in 50% aqueous methanol. A solution of the tartrate in the minimum quantity of water is made alkaline with sodium hydroxide and the free base is extracted with chloroform. The chloroform solution is dried over magnesium sulfate and then evaporated, giving (*l*)-β-hydroxyphenylethylamine as a yellow oil which quickly solidifies. The amine is converted into the guanidine without further purification as described in Example 4. The (*l*)-β-hydroxyphenylethylguanidine sulfate obtained from several different batches of amine having $[\alpha]_D^{23}$ −31 to −33°, compared with −34° for the guanidine obtained using (*l*)-β-hydroxyphenylethylamine prepared by synthesis from pure (*l*)-mandelic acid.

EXAMPLE 6

*l*-Mandelamide (13 g.) dissolved in dry tetrahydrofuran (150 ml.) is added slowly to a stirred suspension of lithium aluminium hydride (10.8 g.) in tetrahydrofuran (200 ml.) in an atmosphere of nitrogen. The mixture is stirred under reflux for four hours and then left at room temperature overnight. The resultant green complex is decomposed by the consecutive addition of water (10 ml.), 40% NaOH (4.4 ml.) and water (40 ml.). The white suspension is filtered and the residue washed with ether. The combined filtrates are then evaporated and the residual oil is dissolved in ether and dried with anhydrous $MgSO_4$. The resulting dry ethereal solution is treated with ethanolic hydrogen chloride which gives a white precipitate of *l*-β-hydroxyphenylethylamine hydrochloride, M.P. 210° C. (after softening at 154° C.). The hydrochloride has an $[\alpha]_D^{23}$ of −47.6° in water, which corresponds to an optically pure product.

The hydrochloride is converted into the free amine by dissolving the amine hydrochloride in water and basifying the resulting solution with sodium hydroxide. The amine is extracted with chloroform and the chloroform extract is dried with anhydrous $MgSO_4$. The solvent is then evaporated leaving an oil which on standing solidifies to a pale yellow solid which is *l*-β-hydroxyphenylethylamine, with an $[\alpha]_D^{23}$ of −41.6°.

The l-β-hydroxyphenylethylamine, prepared in the manner described above, is then converted into l-β-hydroxyphenylethylguanidine sulfate in the manner described above. The product obtained as an $[\alpha]_D^{23}$ of —34.1° in 50% aqueous ethanol.

EXAMPLE 7

Tablets are prepared by mixing and granulating in accordance with known pharmaceutical techniques, for example using the following ingredients.

| Ingredient: | Mg./tablet |
|---|---|
| l-β-hydroxyphenylethylguanidine sulfate (≡10 mg. of base) | 12.7 |
| Maize starch | 24.0 |
| Terra alba | 229.0 |
| Powdered sucrose | 10.0 |
| Gelatin (as a 5% w./v. aqueous solution) | 2.0 |
| Talcum | 3.0 |
| Stearic acid | 3.0 |

The tablets are administered orally to a hypertensive host.

What is claimed is:

1. A pharmaceutical composition having long-lasting hypotensive activity due to catechol amine depletion comprising a nontoxic salt of a base with a pharmaceutically acceptable acid combined with a pharmaceutical carrier in a dosage unit form of a tablet, capsule, pill, sachet or powder, said salt being present in about 2–500 mg. calculated as the base and said base having the structure:

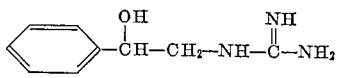

2. A pharmaceutical composition according to claim 1 in which the salt is present in from about 10–100 mg. calculated as the base.

3. A pharmaceutical composition according to claim 1 in which the salt is the laevo isomer essentially free from the dextro isomer.

4. A pharmaceutical composition according to claim 1 in which the salt is the laevo isomer at least 95% pure and in from about 5–50 mg. calculated as the base.

5. A pharmaceutical composition according to claim 1 in which the sulfate salt of the laevo isomer is present.

6. The method of producing hypotensive activity due to catechol amine depletion comprising administering to an animal host in a daily dosage regimen sufficient to induce said hypotensive activity a nontoxic salt of the base with a pharmaceutically acceptable acid, said base being that described in claim 1 wherein said administration is oral or parenteral.

7. The method of claim 6 in which the salt is the essentially pure laevo isomer.

8. The method of claim 6 in which the salt is the laevo isomer in from about 2–200 mg. calculated as the base.

9. The method of claim 6 in which the salt is the sulfate salt of the laevo base in from about 5–50 mg. of base content.

References Cited

Chem. Abst. 32: 512⁴ (1938).

ALBERT T. MEYERS, *Primary Examiner.*

S. J. FRIEDMAN, *Assistant Examiner.*